UNITED STATES PATENT OFFICE.

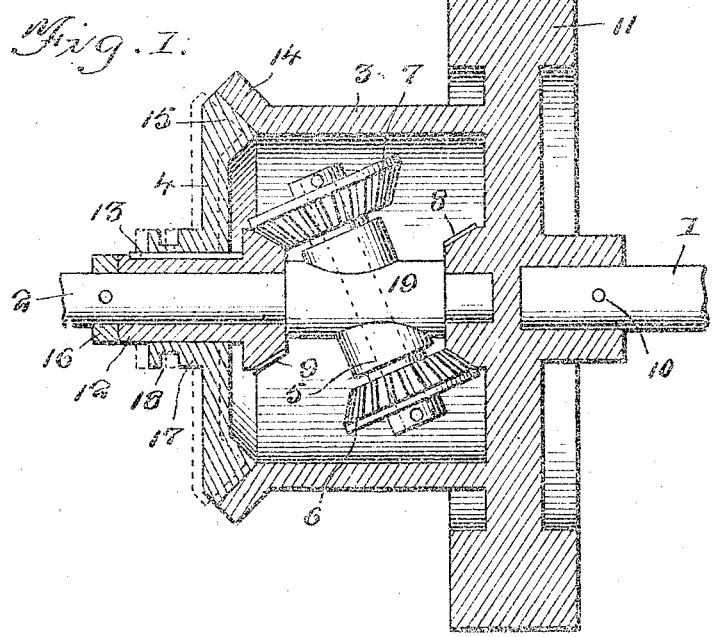
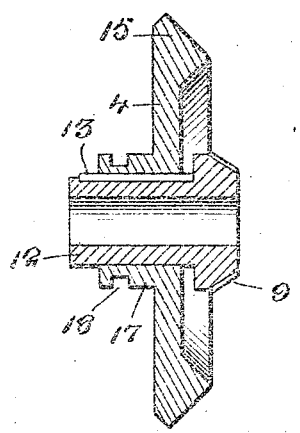
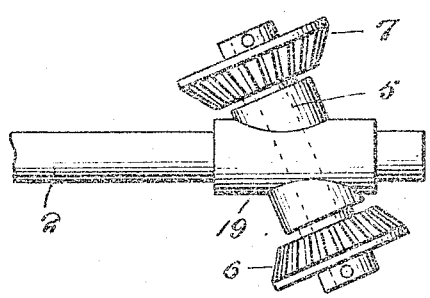

HANS SCHNEIDER, OF NEW YORK, N. Y.

TRANSMISSION-GEARING.

1,244,134.  Specification of Letters Patent.  Patented Oct. 23, 1917.

Application filed February 16, 1917. Serial No. 149,080.

*To all whom it may concern:*

Be it known that I, HANS SCHNEIDER, a citizen of Switzerland, residing at New York, in the county of New York and State of New York, have invented new and useful Improvements in Transmission-Gearings, of which the following is a specificaton.

This invention relates to transmission gearing, one of the main objects in view being to prevent the sudden gripping or grabbing action between the clutch faces by means of which the motion of the driving shaft or clutch member is imparted to the driven shaft or driven clutch member, the coöperating clutch faces on the driving and driven shafts rotating constantly in the same direction as long as the driving shaft is rotating, the arrangement being further such that when one of the clutch members is allowed to slip in relation to the other clutch member, the driven shaft will operate at a different ratio of speed from the driving shaft.

While the transmission gearing hereinafter described is particularly designed for use in connection with the driving mechanism of motor vehicles, it will be apparent as the description proceeds that said transmission gearing is adapted for use in other connections or wherever it is desired to vary the speed of a driving shaft and a driven shaft or discontinue or interrupt the operation of the driven shaft.

Another object in view is to so arrange the motion transmitting gears between the driving and driven shafts that they remain constantly in mesh throughout their whole contacting area thus making it practically impossible to mutilate or strip the teeth of the gears, which so frequently occurs in transmission gearing of the type in which the gears are slidable into and out of mesh. The construction also enables the gearing as a whole to be economically produced and maintained in working condition.

With the above and other objects in view, the invention consists in the novel construction, combination and arrangement of parts, herein described, illustrated and claimed.

In the accompanying drawings:—

Figure 1 is a sectional view of the transmission gearing taken in line with the driving and driven shafts, the latter being shown in elevation.

Fig. 2 is a diametrical section through the driven clutch member and the sleeve to which it is feathered.

Fig. 3 is a fragmentary plan view of the driven shaft, the countershaft, and the bearing for the latter.

Referring to the drawings 1 designates a driving shaft, 2 a driven shaft, 3 a driving clutch member, 4 a driven clutch member and 5 a countershaft having fast thereon gears 6 and 7, the gear 6 meshing with and being driven by a gear 8 on the driving shaft 1, and the gear 7 meshing with and driving a gear 9 loose on the driven shaft but rotating with the driven clutch member 4.

The gear 8 may be fastened to the shaft 1 by a pin or key 10 or any other suitable means and said gear 8 is shown as formed on the web of a fly-wheel 11, this embodiment of the invention adapts it especially for use in connection with motor vehicles. The driving clutch member 3 is also shown as formed integrally with and having a fixed relation to the fly-wheel 11 and the gear 8. The use of the fly-wheel 11 and the integral formation of the gear 8 and the clutch member 3 are not however essential, the essential feature being that the gear 8 and the clutch member 3 revolve as a unit and that both have a fixed relation to the driving shaft 1.

The gear 9 is provided with a hub or sleeve 12 upon which the clutch member 4 is feathered as indicated at 13 thus causing the gear 9 and the clutch member 4 to rotate as one but enabling the clutch member 4 to have a limited sliding movement on the sleeve 12 and therefore relatively to the driven shaft 2. The clutch member 3 is provided with a clutch face 14 and the clutch member 4 is provided with a clutch face 15 to coöperate with the clutch face 14. A collar 16 or its equivalent fast on the driven shaft 2 prevents longitudinal shifting movement of the sleeve 12 so that the gears 6, 7, 8 and 9 are constantly maintained in mesh with each other. The clutch member 4 has a hub 17 which is formed with an annular groove 18 to receive a shifting fork whereby the clutch face 15 may be moved away from the clutch face 14.

The countershaft 5 is journaled to turn freely in a bearing 19, which is carried by and bears a fixed relation to the driven shaft 2. Said bearing is so formed as to give the necessary slant or obliquity to the countershaft 5 in order that the gears 6 and 8 may constantly intermesh, and the gears 7 and 9 also constantly intermesh. The shiftable clutch member 4 is movable longitudinally of the driven shaft 2 and upon the sleeve 12, but the sleeve 12 carrying the gear 9 is not shiftable in said direction. Under the present preferred embodiment of the invention, the gears 6, 7 and 8 have an equal number of teeth, but the gear 9 has either one tooth more or one tooth less than the other gears 6, 7 and 8. Therefore when the clutch face 15 is allowed to slip in relation to the clutch face 14, the gears 6, 7, 8 and 9 operate to turn the sleeve 12 at a different ratio of speed from the driving shaft 1. When, however, the clutch face 15 is moved into driving engagement with the clutch face 14, the gears 6, 7, 8 and 9 are locked and the sleeve 12 and the driven shaft 2 are driven at the same speed as the driving shaft 1. As long as the driving shaft 1 is in operation, the clutch member 4 is being driven in the same direction but the small difference in the ratio of speed between the clutch members 3 and 4 prevents said clutch members from gripping or grabbing suddenly as in the case of ordinary clutch mechanism now in use in which the clutch member carried by the fly-wheel and actuated directly by and at the same speed as the driving shaft, frequently revolves at a much greater speed than the shiftable clutch member, resulting in the disagreeable and injurious sudden grabbing action when the clutch faces are brought into driving contact.

While I have described the clutch member 4 as being feathered to the sleeve 12, it will of course be understood that the clutch member 4 may be fitted upon the sleeve 12 square in cross section or of any other irregular or non-circular shape in cross section, the essential feature in this connection being that the clutch member 4 should be mounted to slide longitudinally of the sleeve 12 but constantly rotate therewith, this in order that the gears 6, 7, 8 and 9 may remain constantly in mesh, while at the same time permitting the necessary shifting movement of the clutch member 4 to disengage the working faces of the clutch members or allow the necessary slippage between said clutch faces.

I claim:—

1. In transmission gearing, the combination of a driving shaft, a driven shaft, a clutch member actuated by the driving shaft at the same speed as the latter, another clutch member coöperating with the first named clutch member and movable longitudinally of the driven shaft, a gear actuated by the driving shaft at the same speed as the latter, a driven gear having a positive driving connection with the second clutch member, a countershaft journaled in a bearing carried by the driven shaft, a gear on said countershaft meshing with the gear actuated by the driving shaft, another gear on the countershaft meshing with said driven gear, all of said gears being in constant mesh, and means permitting the second clutch member to be shifted relatively to the first named clutch member.

2. In transmission gearing, the combination of a driving shaft, a driven shaft, a clutch member actuated by the driving shaft at the same speed as the latter, another clutch member coöperating with the first named clutch member and movable longitudinally of the driven shaft, a gear actuated by the driving shaft at the same speed as the latter, a driven gear having a positive driving connection with the second clutch member, a countershaft journaled in a bearing carried by the driven shaft, a gear on said countershaft meshing with the gear actuated by the driving shaft, another gear on the countershaft meshing with said driven gear, all of said gears being in constant mesh, and means permitting the second clutch member to be shifted relatively to the first named clutch member, said second clutch member being slidably connected with said driven gear to allow for a separation between the working faces of said clutch members.

3. In transmission gearing, the combination of a driving shaft, a driven shaft, a clutch member actuated by the driving shaft at the same speed as the latter, a second clutch member rotatably mounted loose on the driven shaft and movable longitudinally of the latter into and out of engagement with the first named clutch member, and bevel gearing interposed between the driving shaft and the second clutch member, said gearing including a countershaft carried by the driven shaft, said gearing and clutch members being so designed that when the clutch members are in working engagement, they both revolve at the same speed and when said clutch members are not in driving engagement said clutch members revolve at different speeds.

4. In transmission gearing, the combination of two main line shafts, a clutch member having a fixed relation to one of said shafts, a second clutch member having a loose relation to the other shaft and movable longitudinally thereof into and out of engagement with the first named clutch member, and bevel gearing interposed between said main line shafts and including a countershaft carried by the driven shaft, said gearing being so arranged that when the clutch members are in working engagement, said clutch members revolve at the same speed, and when said clutch members are not in driving engagement, said clutch members revolve at different speeds.

In testimony whereof I affix my signature.

HANS SCHNEIDER.